(12) United States Patent
Bulters et al.

(10) Patent No.: US 6,303,070 B1
(45) Date of Patent: Oct. 16, 2001

(54) PROCESS FOR PRODUCTION OF THERMOPLASTIC MOULDED PART

(75) Inventors: Markus J. H. Bulters, Sittard; Petrus H. M. Stokman, Heerlen; Johannes H. Geesink, Schinnen, all of (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/288,333

(22) Filed: Apr. 8, 1999

Related U.S. Application Data

(63) Continuation of application No. PCT/NL97/00576, filed on Oct. 14, 1997.

(30) Foreign Application Priority Data

Oct. 14, 1996 (NL) .................................................. 1004268

(51) Int. Cl.$^7$ .................................................. B29C 45/80
(52) U.S. Cl. .................................. 264/328.7; 264/328.16
(58) Field of Search ............................. 264/328.16, 45.1, 264/45.2, 45.3, 45.4, 45.5, 45.6, 328.7, 291, 328.18, 331.11

(56) References Cited

U.S. PATENT DOCUMENTS

| | | | |
|---|---|---|---|
| 4,923,650 | * | 5/1990 | Antoon, Jr. et al. ................. 264/45.3 |
| 5,843,568 | * | 12/1998 | Masui et al. ......................... 264/45.2 |
| 6,099,949 | * | 8/2000 | Nomura et al. ....................... 264/45.2 |

FOREIGN PATENT DOCUMENTS

| | | | |
|---|---|---|---|
| 7-16933 | * | 1/1995 | (JP) . |
| 97/29896 | * | 8/1997 | (WO) . |

* cited by examiner

*Primary Examiner*—Jill L. Heitbrink
(74) *Attorney, Agent, or Firm*—Pillsbury Winthrop LLP

(57) ABSTRACT

The invention relates to a thermoplastic molded part comprising at least a polyolefin or a polycondensation polymer and reinforcing fibers, characterized in that 1 to 60 wt. % of the molded part consists of reinforcing fibers with a length of between 0.8 and 15 mm, at least a portion of which is present partly in the center and partly in the non-porous dish surface, and that the molded part has a porosity of between 5 and 95 vol. %. The invention also relates to a process for producing such a molded part.

3 Claims, No Drawings

PROCESS FOR PRODUCTION OF THERMOPLASTIC MOULDED PART

This is a Continuation of International Application No. PCT/NL97/00576 filed Oct. 14, 1997 which designated the U.S.

FIELD OF THE INVENTION

The invention relates to a process for producing a thermoplastic moulded part, which comprises the following steps:
a) dispersing reinforcing fibres in a melt of a polyolefin or a polycondensation polymer,
b) injecting the polymer composition thus obtained into a closed mould by means of an extruder or an injection-moulding machine.

BACKGROUND OF THE INVENTION

A process for injection-molding a flat plate of fiber-reinforced polypropylene is described in JP-A-5-17631.

JP-A-7-16933 discloses a similar process; the specific modulus and specific strength of a fiber reinforced article so made needs improvement.

A drawback of the method described in JP-A-5-17631 is that the fibre-reinforced polypropylene described herein results in a specific modulus and a specific strength which are lower than desired. The aim of the invention is to eliminate this drawback.

SUMMARY OF THE INVENTION

This aim is achieved according to the invention in that the melt is injected through a nozzle into the mould, the mould is partly opened when at least part of the surface of the moulded part has cooled to below the softening temperature of the polyolefin or the polycondensation polymer while the centre of the moulded part has a temperature above the said softening temperature, and 1 to 60 wt. % of the mixture consists of reinforcing fibres with an average length of between 0.8 and 15 mm.

The moulded part surprisingly expands during the opening of the mould and a thermoplastic moulded part with a porous centre is obtained. The expanded moulded part obtained by the process according to the invention has a better specific modulus and strength than the known moulded part.

DETAILED DESCRIPTION OF THE INVENTION

Partly opening the mould in this specification is understood to mean the opening of the mould over a certain path length until the distance between both mould halves is equal to the desired thickness of the moulded part.

In the case of moulded parts, the requirements with respect to stiffness and strength determine the moulded part's thickness, and hence also its price. The so-called specific modulus and strength are used to enable comparison of the modulus and strength of materials for moulded parts. They are index numbers that are measures of the resistance offered by a moulded part to deformation and rupture, respectively, under the influence of a bending load per unit of density. The specific modulus and strength are used especially to compare the modulus and strength of materials having different densities when searching for the lightest material offering the greatest stiffness or strength for a particular shape. A detailed description of these index numbers is given in the "Materials Selector: guidelines for minimum weight design", Chapman & Hall, London.

Preferably, a converging nozzle is used in the process according to the invention, for this surprisingly causes better expansion of the moulded part during the opening of the mould. The use of a converging nozzle is known from WO-A-94/11177, but here a converging nozzle is used to obtain an orientation of the plastic and/or the fibre reinforcement in the moulded part, as a result of which this may possess a higher stiffness and strength in a particular direction. WO-A-94/11177 nowhere mentions the fact that a converging nozzle could lead to expansion of the moulded part, while the process according to the invention causes no or virtually no anisotropy in the moulded part.

A converging nozzle can be obtained with a conically ending nozzle, but also by for example placing a breaker plate (a plate with a number of openings) in front of the nozzle.

The merits of the invention are brought out very clearly if the process according to the invention is used for the production of dish-shaped moulded parts.

Such a moulded part possesses two dish surfaces, which are in this description understood to be the two, usually almost parallel, surfaces lying opposite one another, whose length and width are larger than the thickness of the moulded part lying between these surfaces. The dish surfaces need not only be flat, but may for instance also be curved or doubly curved.

Partly opening the mould only when at least one dish surface has cooled to below the softening temperature of the polyolefin or the polycondensation polymer results in a moulded part with at least one dish surface that is not porous, that is, with at least one surface free of pores. The presence of at least one dish surface that is not porous proves to result in an improvement of the specific modulus and strength with respect to a non-expanded moulded part. In addition, such a surface can suitably be painted.

Preferably, the mould is partly opened only when both dish surfaces have cooled down.

As a result, both dish surfaces are non-porous so that a moulded part with a sandwich structure is obtained. A sandwich structure gives a dish-shaped moulded part an extra high stiffness and strength. A weak point in sandwich structures is often the adhesion between the centre and the dish surface. In known sandwich structures this adhesion is often improved by using a so-called 3D fabric, which is understood to be a three-dimensional fibre structure in the form of a fabric. A characteristic of a 3D fabric is that some of the fibres that reinforce the centre continue into the dish surface, which promotes the adhesion between the centre and the dish surface. 3D fabrics and composites made therefrom are described by A. Schrauwers in "Kunststof Magazine", 1993, page 16. Drawbacks of using a 3D fabric are that it has to be made to measure beforehand and that it must separately be placed in the mould for each injection. A 3D fabric can moreover only be used in combination with thermosetting plastics with a very low viscosity. It has surprisingly been found that with the process according to the invention at least a portion of the reinforcing fibres is present partly in the centre and partly in the non-porous dish surface, as a result of which it is not necessary to use a 3D fabric. It has also been found that the fibres in the centre of the moulded part form a three-dimensional network and lie parallel to the surface at the moulded part's dish surface. With this the process according to the invention for the first time offers the possibility of using the injection-moulding technique to produce (half) a fibre-reinforced sandwich from a thermoplastic fibre-reinforced plastic, in which the fibres of the centre continue into the surface. This structure contributes to the excellent specific modulus and strength, even if only one dish surface is non-porous.

The melt flow index (MFI) is in this description understood to be the melt flow index measured according to ISO 1133. For polypropylene the melt flow index is measured at 230° C. under a weight of 2.16 kg.

The melt flow index of the polyolefin to be used in the process according to the invention is preferably higher than 30 g/10 min, even more preferably higher than 50 g/10 min. It has been found that at such a melt flow index better expansion of the moulded part takes place when the mould is opened. Preferably, the melt flow index is lower than 700 g/10 min.

The number average molecular mass ($M_n$) of the polycondensation polymers to be used in the process according to the invention is preferably higher than 5000 g/mol. The process proves to be effective for all the polycondensation polymers so far available. With the present polymerization technologies approximately 90,000 g/mol is the upper limit of the molecular mass of available polycondensation polymers. It may be expected that polycondensation polymers with higher molecular masses, if they become available, can be processed with the process according to the invention, up to a molecular mass of approximately 200,000 g/mol.

The 'average fibre length' is in this description understood to be the number average fibre length. This can be determined in the moulded part by measuring the length of the fibres with the aid of a light microscope after the polymer matrix has been removed, for example by burning out the polymer.

If the polymer composition contains glass fibres as reinforcing fibres, the polymer composition preferably contains 5–60 wt. %, more preferably 10–60 wt. %, of the glass fibres. If the polymer composition contains carbon fibres as reinforcing fibres, the polymer composition preferably contains 1–10 wt. %, preferably 2–7 wt. %, of the carbon fibres.

It has been found that such mixtures expand very well.

It has been found that the moulded part can easily expand to twenty times its original thickness. This results in a moulded part with a porosity of 95%. The porosity (P) of a moulded part is here and hereinafter understood to be:

$$P=(d(0)-d(p))/d(0)*100(\%),$$

where d(0) is the density before expansion and d(p) the density after expansion. An advantage of the process according to the invention is also that a porous moulded part can be obtained without having to use a chemical or physical foaming agent. A high porosity of the moulded part is advantageous with respect to achieving a high specific modulus and strength because these index numbers are inversely proportional to the density.

Preferably, the rate at which the mould is opened is chosen in dependence of the viscosity of the polyolef in or the $M_n$ of the polycondensation polymers. At a high viscosity/$M_n$ preferably a lower rate is chosen than at a low viscosity/$M_n$. The best results are obtained by adjusting the rate to the expansion rate of the moulded part so that, when the mould is opened, the moulded part continues to be pressed against the mould halves as a result of the expansion of the moulded part and the two dish surfaces accurately mirror the adjacent mould surfaces.

The mould is preferably opened at a rate that lies between 0.05 and 10 mm/sec, since this results in a moulded part having a high porosity and a surface without pores.

It has been found that these limits may vary depending on the amount of moisture in the dispersion. The greater the amount of moisture present in the dispersion, the faster or further the mould may be opened while still at least one smooth dish surface free of pores is obtained. A person skilled in the art will be able to easily determine the rate at which and the distance over which the mould is opened. Preferably, the amount of moisture in the dispersion is less than 5000 ppm. That way the occurrence of sink marks in the surface is avoided.

The invention also relates to a dish-shaped thermoplastic moulded part comprising at least a polyolefin or a polycondensation polymer and reinforcing fibres.

Such moulded parts are described in JP-A-5-17631. The moulded parts described in JP-A-5-17631 contain a polyolefin with a melt flow index of 30 g/10 min. or higher and more than 20 wt. % reinforcing fibres with a length of 5 mm or more.

A drawback of the moulded parts described in JP-A-5-17631 is that they have a specific modulus and specific strength that are too low for the fibre-reinforced polyolefins employed.

The aim of the invention is to provide a moulded part that does not possess the said drawback.

This aim is achieved in that the moulded part has a porous centre and at least one non-porous dish surface, 1 to 60 wt. % of the moulded part consists of reinforcing fibres with an average length of between 0.8 and 15 mm, at least a portion of which is present partly in the centre and partly in the non-porous dish surface, and the moulded part has a porosity of between 5 and 95 vol. %. Preferably between 10 and 90%, more preferably between 20 and 85%. The expanded moulded part according to the invention has a higher specific stiffness and strength than non-expanded moulded parts, which are for example described in JP-A-5-17631.

In the case of moulded parts with a porosity of more than 20 wt. % the anisotropy proves to be very low, while moulded parts with a porosity of less than 95 vol. % have a dish surface free of pores.

The polyolefin preferably has a melt flow index of at least 30 g/10 min.

The polyolefin can be chosen from the group comprising polyethylene and polypropylene or copolymers of ethylene and propylene. Preferably, the polyolefin contains polypropylene. The advantage of polypropylene is the high melting point, as a result of which the moulded part has a higher heat deflection temperature and a relatively low cost price.

Suitable polycondensation polymers are polycarbonate, polyester, polyamide, polyarylate, polyketone, polyimide, polyaramide, liquid crystal polymer (LCP), polyurethane and copolymers of such polycondensates. Preferably, polycondensation polymers are chosen from the group comprising polyamide 6, polyamide 6.6, polyamide 11, polyamide 12, polyethylene terephthalate, polybutylene terephthalate or copolymers thereof. The advantage of the latter group is the relatively low cost price.

Reinforcing fibres can be chosen from the group comprising carbon fibres, aramide fibres, metal fibres, glass fibres, ceramic fibres or mixtures hereof. Preferably, the moulded part according to the invention contains glass fibres or carbon fibres as the reinforcing fibres. Glass fibres have the advantage that they are cheap. Carbon fibres have the advantage that they have a high tensile strength.

Although the advantages of the invention are already achieved when at least one dish surface is not porous, preferably both dish surfaces are not porous. The moulded part then has a sandwich structure. The advantage of a sandwich structure is that the specific material properties are better than those of a moulded part that does not have this sandwich structure. As a result of this sandwich structure and the fact that a portion of the reinforcing fibres is partly in the centre and partly in the non-porous dish surface, the moulded part according to the invention preferably has a specific flexural modulus of at least 10.

Molded parts according to the invention are preferably used in construction panels, elements/body panels for the automotive industry, the white goods and building industrie; splash shields, noise shields, fire walls, parcel shelves, mudguards, bonnets, dashboards, panels for washing machines, tumble dryers, caravans and planes, bumper beams, car doors, loading platforms, helmets, armour plates, insulation walls, both for heat and noise, containers, pallets, acoustic baffles, roof liners, transport containers and dashboards. The moulded parts according to the invention can also be used in bicycle parts, scooter parts and motorcycle parts. Especially in applications in which sound insulation is important the moulded parts according to the invention present a major advantage. In particular the use of the moulded part according to the invention presents advantages in products that have to meet sound-proofing requirements. It has been found that differences in density between the dish surface free of pores and the interior of the moulded parts according to the invention have a favourable effect on their sound-proofing properties.

The invention will be further elucidated with reference to the following examples.

Reinforcing fibres can be dispersed in a melt of a polyolefin or a condensation polymer by using as a starting material a chopped strand of continuous fibres that have been pultruded or sheathed with the thermoplastic in question.

In pultrusion a bundle of continuous fibres is spread out into individual fibres and drawn through an impregnation die, into which the melted thermoplastic is injected. As the fibres have been spread out, each filament is entirely wetted and impregnated by the melted thermoplastic. A smooth strand with a diameter of about 3 mm is drawn from the die and then cooled. Finally the strand is chopped into a granulate of the desired length (for instance 10–12 mm). The fibres are generally parallel to one another in the granulate, with each fibre being separately surrounded by thermoplastic. Pultruded fibres are marketed for example by Hoechst/PCI (Compec®, Celstran®), Borealis (Nepol®) LNP/Kawasaki Steel (Verton®).

Sheathing continuous reinforcing fibres with thermoplastic without the individual fibres being wetted is in this description called Continuous Glass Sheathing (CGS). The advantage over pultrusion is the higher production rate (and hence lower costs). In the case of CGS granulate, too, the length of the glass is the same as the length of the granulate and the fibres are parallel to one another. Pultruded and sheathed fibres are easily dispersed in the melt of a thermoplastic in the melt zone of an extruder.

The melt flow index was measured according to ISO 1133, for polypropylene at 230° C. and a weight of 2.16 kg.

The flexural modulus and flexural strength were determined according to ISO 178, with an l/d ratio of 16.

The moulded part's resistance to bending under the influence of a force is expressed in the specific modulus and the resistance to rupture in the specific strength. These specific quantities depend on the shape of the object in question. The specific modulus and strength of a dish-shaped moulded part are best approximated by those of a flat plate. The specific modulus of a flat plate is the quotient of the cube root of the flexural modulus and the density, the index number being obtained when the flexural modulus is expressed in MPa and the density in $kg/m^3$. The specific strength of a plate is given by the quotient of the square root of the flexural stress and the density, the index number being obtained when the flexural stress is expressed in MPa and the density in $kg/m^3$. A description of these index numbers is given in "Materials Selector: guidelines for minimum weight design", Chapman & Hall, London.

A Stork injection-moulding machine of type SX-3000-2100 was used in the tests. The employed screw was a general-purpose screw with a diameter of 72 mm, a length of 22 D (feed/compression/pump: 12 D/6 D/4 D). The depth of thread in the feed zone is 9.75 mm and that in the pump zone 5 mm. The compression ratio is 1.95.

The screw tip is a standard screw tip for the processing of PVC combined with a streamlined annular valve. The nose tip is a standard nose tip with a length of 117 mm and an internal diameter of 19 mm, which converges over a length of 10 mm to an ultimate diameter of 4 mm.

The material was injected into a flat plate mould (510× 310 mm) via a central sprue.

EXAMPLE I

A moulded part was produced using as material a mixture consisting of a glass fibre roving sheathed with PP. The glass fibre roving is comingled with PP fibres. The comingled glass/PP fibre was obtained from Vetrotex (Twintex®, R PP75 630-02); the MFI (230° C., 2.16 kg) of the PP fibre is 20 g/10 min. The PP sheathing was obtained from DSM (Stamylan® P 112MN40). The MFI (230° C., 2.16 kg) of the PP sheathing is 47 g/10 min. The mixture's glass content is 37.5 wt. %, the weight ratio of $PP_{MFI=100}$ to $PP_{MFI=20}$ is 4:1. The MFI of the PP in the mixture is hence 40 g/10 min. The length of the granulate is 12 mm.

The Stork injection-moulding machine described above was used as the injection-moulding machine, with the following settings: The cylinder temperatures for the hopper/zone 1/zone 2/zone 3/zone 4/zone 5/nose are successively: 40/280/290/300/320/320/320° C.; mould temperature: 110° C.; speed: 20 rpm; metering path: 180 mm; back pressure: 0.3 MPa; holding pressure: none; cooling time: 105–150 sec., depending on the thickness of the article; injection rate: 83 mm/sec.; metering time: 35 sec.; degree of loading: 100%.

The material was dispersed in the injection-moulding machine and injected into the plate mould, which was 4 mm thick, via a converging nozzle. Immediately after injection, the mould was opened at a linear rate of 0.08 mm/sec. over a path length of 3.1 mm. After the cooling time, in which the entire moulded part was cooled further to below the PP's softening temperature, the mould was opened further and the moulded part was ejected.

The moulded part was found to have expanded homogeneously and has a thickness of 7.1 mm, a density of 602 $kg/m^3$ and a porosity of 51%. The flexural modulus (E) is 2325 MPa, the flexural strength 44.3 MPa and the elongation at break ($e_{break}$) is 3.3%. The specific modulus ($E_{spec}$) is 10.2 and the specific strength ($S_{spec}$) is 3.5. The surface is free of pores and smooth on one side and porous and smooth on the other side. This shows that at an MFI=40 g/10 min. the expansion takes place so slowly that at the chosen opening rate only one surface of the moulded part has sufficient contact with the mould to form a dish surface that is not porous.

EXAMPLE II

A moulded part was produced using as material a mixture consisting of a glass fibre roving sheathed with PP. The glass fibre roving is comingled with PP fibres. The comingled glass/PP fibre was obtained from Vetrotex (Twintex®, R PP75 630-02); the MFI of the PP fibre is 20 g/10 min. The PP sheathing was obtained from BASF (Novolen® 1100VC). The MFI of the PP sheathing is 100 g/10 min. The mixture contains 37.5 wt. % glass, the weight ratio of $PP_{MFI=100}$ to $PP_{MFI=20}$ is 4:1. The MFI of the PP in the mixture is hence 70 g/10 min. The length of the granulate is 12 mm.

The material was dispersed in the Stork injection-moulding machine, at the same settings as in Example I, and was injected into the plate mould, which was 4 mm thick, via a converging nozzle. Immediately after injection the mould was opened at a linear rate of 0.08 mm/sec. over a path length of 3.1 mm. After the cooling time the mould was opened further and the moulded part was ejected.

The moulded part was found to have expanded homogeneously and has a thickness of 7.1 mm, a density of 567 kg/m$^3$ and a porosity of 54%. The flexural modulus (E) is 2555 MPa, the flexural strength 46.9 MPa and the elongation at break ($e_{break}$) is 3.1%. The specific properties are $E_{spec}$=11.2 and $\sigma_{spec}$=4.0. The surface is completely smooth and free of pores on both sides.

EXAMPLE III

The material, settings of the injection-moulding machine and procedure up to and including injection were the same as in Example II. The mould was however 3 mm thick instead of 4 mm.

Immediately after injection the mould is opened at a linear rate of 0.08 mm/sec. over a path length of 1.9 mm. After the cooling time the mould was opened further and the moulded part was ejected.

The moulded part was found to have expanded homogeneously and has a thickness of 4.9 mm, a density of 610 kg/m$^3$ and a porosity of 51%. The flexural modulus is 2689 MPa, the flexural strength 55.5 MPa and the elongation at break is 3.4%. The specific properties are $E_{spec}$=10.6 and $\sigma_{spec}$=3.9. The surface is completely free of pores and smooth on both sides.

Comparative Experiment A

The material, settings of the injection-moulding machine and procedure are the same as in Example I, only now the entire moulded part is cooled immediately after injection to below the PP's softening temperature without the mould being partly opened. After the cooling time the mould is opened completely and the moulded part is ejected.

The moulded part has a thickness of 4.0 mm, a density of 1028 kg/m$^3$ and a porosity of 16%. The flexural modulus of the plate is 4266 MPa, the flexural strength 110.9 MPa and the elongation at break is 4.0%. The specific properties are $E_{spec}$=7.4 and $\sigma_{spec}$=3.1. The surface is completely free of pores and smooth on both sides. The moulded part was found to have not expanded and had low specific properties. The 16% porosity is a consequence of voids formed because no holding pressure was used.

Comparative Experiment B

The material, settings of the injection-moulding machine and procedure are the same as in Experiment A, only now a holding pressure of 3.5 MPa is applied for 10 sec. immediately after injection. After the cooling time the mould is entirely opened and the moulded part is ejected.

The non-expanded moulded part has a thickness of 4.0 mm, a density of 1225 kg/m$^3$ and the porosity is 0%. The flexural modulus is 6720 MPa, the flexural strength 178.3 MPa and the elongation at break is 4.0%. The specific properties are $E_{spec}$=7.2 and $\sigma_{spec}$=3.4. The surface is completely free of pores and smooth on both sides. This experiment shows that the porosity of the moulded part of Experiment A is a consequence of the absence of holding pressure.

Comparative Experiment C

The material, settings of the injection-moulding machine and procedure are the same as in Example I, only now an holding pressure of 3.5 MPa is applied for 10 seconds immediately after injection. Immediately after this, the mould is partly opened at a linear rate of 0.08 mm/s over a distance of 3.1 mm. After the cooling time the mould is entirely opened and the moulded part is ejected.

On both sides the moulded part shows rough, porous dish surfaces from which the glass fibres project. The thickness varies from 4 to 7.1 mm. The density is lower than 1000 kg/m$^3$. This shows that the use of a holding pressure does not promote homogeneous expansion of the moulded part. In the 10 seconds for which the holding pressure was applied the moulded part has already cooled to such an extent that there is no longer a mixture with a temperature above the PP's softening temperature between the two dish surfaces.

Comparative Experiment D

The settings of the injection-moulding machine and the procedure are the same as in Example I, only now a different material is used: Stamylan® P 112MN40, with an MFI of 47 g/10 min and 40 wt. % short glass fibres (length 0.1–0.3 mm).

Immediately after injection the mould is opened at a linear rate of 0.08 mm/sec. over a path length of 3.1 mm. After the cooling time the mould was opened further and the moulded part is ejected. The moulded part has not expanded and has not assumed the shape of the mould and has a porosity of 12%. This shows that a glass fibre length of 0.1–0.3 mm is too short to allow the moulded part to expand.

EXAMPLE IV

The procedure and settings of the injection-moulding machine are the same as in Example II, only now the settings of the cylinder temperature for the hopper/zone 1/zone 2/zone 3/zone 4/zone 5/nose are successively: 40/280/290/310/325/325/325° C.

The material used in this example is Fiberstran® G1/40 from DSM Engineering Plastics USA (a pultrusion granulate consisting of polyamide with an $M_n$ of 25,000 g/mol containing 40 wt. % glass fibre).

Immediately after injection the mould is opened at a linear rate of 0.55 mm/sec. over a path length of 3.1 mm. After the cooling time the mould is opened further and the moulded part is ejected.

The moulded part is found to have expanded homogeneously and has a thickness of 6.1 mm, a density of 625 kg/m$^3$ and a porosity of 57%. The mechanical properties were measured using dry samples. The plate's flexural modulus is 4400 MPa, the flexural strength 85 MPa and the elongation at break is 3.2%. The specific properties are $E_{spec}$=12.2 and $\sigma_{spec}$=4.7. The surface is free of pores and smooth on both sides.

EXAMPLE V

The settings of the injection-moulding machine and the procedure are the same as in Example IV.

The material used in this example is Celstran® N66C40-01-04, a pultrusion material obtained from PCI/Hoechst-Celanese consisting of PA 6.6 with an $M_n$ of more than 5000 g/mol and containing 40 wt. % carbon fibre.

Immediately after injection the mould is opened at a linear rate of 0.55 mm/sec. over a path length of 2.7 mm. After the cooling time the mould is opened further and the moulded part is ejected.

The moulded part is found to have expanded homogeneously and has a thickness of 5.7 mm, a density of 671 kg/m³ and a porosity of 50%. The mechanical properties were measured using dry samples. The flexural modulus of the plate is 8600 MPa, the flexural strength 110 MPa and the elongation at break 2.9%. The specific properties are $E_{spec}$=14.2 and $\sigma_{spec=4.9}$. The surface is free of pores and smooth on both sides.

EXAMPLE VI

A moulded part was produced using as material a mixture consisting of a glass fibre roving sheathed with PP. The fibre of the glass fibre roving was obtained from Vetrotex and continuous PP fibres (Twintex®, R PP75 630-02) have been added in addition to glass fibres. The MFI of the PP fibres is 20 g/10 min. The PP sheathing was obtained from Montell (Valtec® HH442-H). The MFI of the sheathing is 700 g/10 min. The mixture contains 37.5 wt. % glass, the weight ratio of $PP_{MFI=700}$ to $PP_{MFI=20}$ is 4:1. The MFI of the PP in the mixture is hence 340 g/10 min. The length of the granulate is 12 mm. The mixture's moisture content, measured via the Karl-Fischer method, is less than 100 ppm.

As the injection-moulding machine use was made of the Stork injection-moulding machine described above, with the following settings: the cylinder temperatures for the hopper/zone1/zone2/zone3/zone4/zone5/nose are successively 40, 190, 210, 230, 270, 285, 285° C.; mould temperature: 85° C.; speed: 40 rpm; metering path: 110 mm; back pressure: 0.1 MPa; holding pressure: none; cooling time: 60–80 sec.; injection rate: 100 mm/min; metering time: 25 sec.; degree of loading: 100%.

The material was dispersed in the injection-moulding machine and injected into the plate mould, which was 2 mm thick, via a converging nozzle. Immediately after injection the mould was opened at a linear rate of 0.1 mm/sec. over a path length of 1.8 mm. After the cooling time, in which the entire moulded part was cooled further to below the PP's processing temperature, the mould was opened further and the moulded part was ejected. The moulded part was found to have expanded homogeneously and has a thickness of 3.8 mm, a density of 645 kg/m3 and a porosity of 40%. The flexural modulus is 3105 MPa, the flexural strength 54.5 MPa and the elongation at break 3.9%. The specific properties are $E_{spec}$=10.5 and $\sigma_{spec}$=3.6. The surface is completely free of pores and smooth on both sides.

EXAMPLE VII

The machine settings of the injection-moulding machine are the same as in Example VI, except for the path length over which the mould opens immediately after injection. The material is also the same as in the previous example. Immediately after injection the mould was opened at a linear rate of 0.1 mm/sec. over a path length of 2.9 mm. After the cooling time, in which the entire moulded part was cooled further to below the PP's processing temperature, the mould was opened further and the moulded part was ejected. The surface of the moulded part was not completely free of pores on both sides.

EXAMPLE VIII

The machine settings of the injection-moulding machine are the same as in Example VI, except for the path length over which the mould opens immediately after injection. The material is also the same as in the first example, except for the measured moisture content, which was 2732 ppm. Immediately after injection the mould was opened at a linear rate of 0.1 mm/sec. over a path length of 2.9 mm. After the cooling time, in which the entire moulded part. was cooled further to below the PP's processing temperature, the mould was opened further and the moulded part was ejected.

The moulded part was found to have expanded homogeneously and has a thickness of 4.9 mm, a density of 490 kg/m³ and a porosity of 60%. The flexural modulus is 1869 MPa, the flexural strength 31.5 MPa and the elongation at break 3.7%. The specific properties are $E_{spec}$=11.7 and $\delta_{spec}$=3.6. The surface is completely free of pores and smooth on both sides.

EXAMPLE IX

The machine settings of the injection-moulding machine are the same as in Example VI, except for the path length over which the mould opens immediately after injection. The material is also the same as in the first example, except for the measured moisture content, which was 5600 ppm. Immediately after injection the mould was opened at a linear rate of 0.1 mm/sec. over a path length of 2.9 mm. After the cooling time, in which the entire moulded part was cooled further to below the PP's processing temperature, the mould was opened further and the moulded part was ejected. The surface is completely free of pores on both sides and shows a substantial number of sink marks caused by entrained, undissolved moisture.

What is claimed is:

1. Process for producing a thermoplastic moulded part, which comprises the following steps:
    a) dispersing reinforcing fibres in a melt of a polyolefin or a polycondensation polymer,
    b) injecting the polymer composition thus obtained into a closed mould by means of an extruder or an injection-moulding machine, wherein the polymer composition, having an amount of moisture less than 5000 ppm, is injected into the mould through a converging nozzle, without the use of a chemical foaming agent, the mould is partly opened when at least a part of the surface of the moulded part has cooled to below the softening temperature of the polyolefin or the polycondensation polymer while the centre of the moulded part has a temperature above said softening temperature, and 1 to 60 wt. % of the polymer composition consists of reinforcing fibres having an average length of between 0.8 and 15 mm.

2. Process according to claim 1, wherein the moulded part is dish shaped.

3. Process according to any one of claims 1 or 2, wherein the melt flow index of the polyolefin is higher than 30 g/10 min.

* * * * *